(12) United States Patent
Kawamoto et al.

(10) Patent No.: US 6,169,159 B1
(45) Date of Patent: *Jan. 2, 2001

(54) ALCOHOL-BLOCKED BROMINATED BISPHENOL A EPOXY RESIN FLAME RETARDANTS FOR CARBONYL-CONTAINING THERMOPLASTIC RESINS

(75) Inventors: Toshihiko Kawamoto; Tetsunori Sato; Yoshiyuki Morikawa, all of Tokyo (JP)

(73) Assignee: Tohto Kasei Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/027,485

(22) Filed: Feb. 20, 1998

(30) Foreign Application Priority Data

Jul. 28, 1997 (JP) .................................................... 9-218167

(51) Int. Cl.$^7$ .............................. C08K 7/14; C08L 67/03; C08L 69/00; C08L 77/00
(52) U.S. Cl. .......................... 528/102; 523/457; 523/458; 523/459; 523/466; 523/468; 525/107; 525/111; 525/423; 525/438; 525/463; 525/480; 525/523; 528/110

(58) Field of Search ..................................... 525/480, 523, 525/107, 111, 423, 438, 463; 528/110, 102; 523/457, 458, 459, 466, 468

(56) References Cited

U.S. PATENT DOCUMENTS

| | | | |
|---|---|---|---|
| 5,221,704 | * 6/1993 | Shimotsuma et al. | 524/436 |
| 5,336,735 | * 8/1994 | Takahashi et al. | 525/122 |
| 5,376,718 | * 12/1994 | Yada | 525/132 |

FOREIGN PATENT DOCUMENTS 3-227370 * 10/1991 (JP).
7-300546 * 11 1995 (JP).

* cited by examiner

Primary Examiner—Robert E. L. Sellers
(74) Attorney, Agent, or Firm—Griffin & Szipl, P.C.

(57) ABSTRACT

A halogenated flame retardant for a thermoplastic resin with carbonyl linkages in the main chain such as polyethylene terephthalate or polybutylene terephthalate is obtained by the modification of a brominated bisphenol A epoxy resin optionally advanced with brominated bisphenol A by reaction of the epoxy groups with a $C_1$–$C_8$ alcohol such as methanol or butanol to the extent that the ratio of unmodified epoxy groups to alcohol-modified epoxy groups is from 2/1 to 1/2.

5 Claims, No Drawings

ALCOHOL-BLOCKED BROMINATED BISPHENOL A EPOXY RESIN FLAME RETARDANTS FOR CARBONYL-CONTAINING THERMOPLASTIC RESINS

This invention relates to halogenated epoxy resin flame retardants and flame resistant thermoplastic resin compositions containing such flame retardants. The flame resistant thermoplastic resin composition using said flame retardant not only has a high degree of flame retardation, but it also affords excellent processability in that it has properties such as excellent heat resistance, resistance to hydrolysis, flow, moldability, mechanical characteristics, and so on, and in that it will not gel in an injection molder or extruder, showing excellent processability. In addition, this flame resistant resin composition can be used in OA (office automation) machine parts and home appliances, connectors, housings, automotive parts, transformers, coil bobbins, and like areas requiring flame resistance, durability, and resistance to hydrolysis.

BACKGROUND OF THE TECHNOLOGY

Thermoplastic engineering plastics containing carbonyl groups in the main chain, such as polyester resins including polyethylene terephthalate (abbreviated as PET), polybutylene terephthalate (abbreviated as PBT) polyamide resins such as nylon and the like, polycarbonate resins and the like, exhibit good mechanical properties and excellent electrical insulation and moldability. Polymer alloys of any combination containing at least one component selected from the above thermoplastic resins with other thermoplastic resins such as ABS or like polystyrene resins, polyolefin resins such as polyethylene (abbreviated as PE), polypropylene (abbreviated as PP), and polyether resins such as polyacetal, exhibit features embodying excellent properties in flow, heat resistance, dimensional stability and the like. Resins and polymer alloys having carbonyl groups in these main chains have been much used recently in parts of OA machines and home appliances, housings, connectors, automotive parts, and the like.

However, resins containing carbonyl groups in the main chain and polymer alloys thereof, are flammable and hydrolyzable. This prompted efforts at improving their flame retardation and resistance to hydrolysis. In particular, the fields of electrical and electronic parts such as in OA machines, home appliances and so on and automotive parts require not only flame resistance, but also retention of electrical insulation and mechanical strength under high temperature and high humidity environments, where improved resistance to hydrolysis is also considered to be important.

A variety of halogenated organic compounds have been proposed to impart flame resistance to thermoplastic resins containing carbonyl linkages in the main chain in the past. Typical ones include tetrabromobisphenol A (abbreviated as TBA), decabromodiphenyl ether (abbreviated as DBDPE), brominated polycarbonate, brominated polystyrene, brominated epoxy resin, brominated epoxy resins with their epoxy groups completely blocked with tribromophenol (abbreviated as TBP), and the like. In particular, the first two inexpensive compounds are often used.

However, TBA or DBDPE used as a flame retardant is deficient in that it tends to bleed out, substantially reducing the surface characteristics of the molded articles. That is, the surface of the molded article is fogged, becomes chalky, or loses luster. An epoxy resin which is nearly completely blocked with TBP has essentially no epoxy groups left so that one cannot expect to make any improvement in resistance to hydrolysis. When a brominated epoxy resin is blended with polyesters such as PET, PBT, and the like, polycarbonate, polyamide resin, and so on, it is exposed to high temperatures over a long period of time in an extruder or molding machine during mixing, presenting the risk that the two terminal epoxy groups may react with the terminal carboxyl or hydroxyl groups of the polyester or the terminal phenolic hydroxyl groups of the polycarbonate or the active hydrogen of polyamide and so on, causing discoloration or gellation. Japanese Patent Application laid-open H8-157592 proposes a halogenated resin containing no terminal epoxy groups, but the lack of an epoxy group fails to provide any anticipated effect of inhibiting hydrolysis for polyester, polycarbonate, or polyamide resins all having carbonyl linkages in the main chain.

SUMMARY OF THE INVENTION

The present invention provides an improved flame retardant and a flame resistant thermoplastic resin composition by the combined use of a halogenated bisphenol epoxy resin with part of the epoxy groups being blocked by a $C_{1-8}$ alcohol, an auxiliary flame retardant, an inorganic filler, and optionally other additives, thereby imparting a high degree of flame resistance as well as excellent resistance to hydrolysis, heat resistance, and flow, without causing gellation in the cylinder or mold of an injection molder or extruder.

DETAILED DISCLOSURE OF THE PREFERRED EMBODIMENTS

This invention is a halogenated epoxy resin type flame retardant for a thermoplastic resin having carbonyl linkages in the main chain, mainly comprising a halogenated epoxy resin type flame retardant represented by general chemical formula 1, Formula 1:

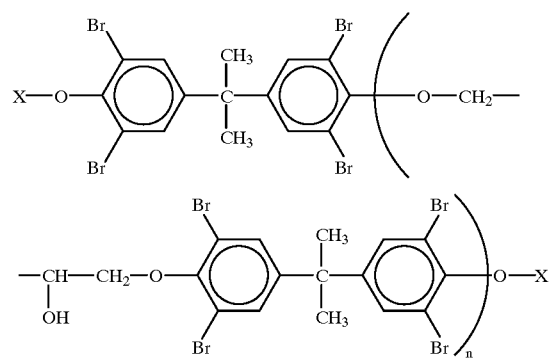

where X is Formula I:

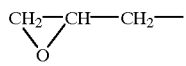

or Formula II:

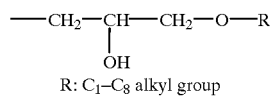
R: $C_1$–$C_8$ alkyl group and the ratio, (Formula I)(Formula II), is 2/1–1/2, having an epoxy equivalent in the range of 750–4000 g/eq, and having the degree of polymerization n in the range of 0–10; and a flame resistant thermoplastic resin composition comprising, per 100 parts by weight of a thermoplastic resin containing carbonyl linkages in the main chain, 1–40 parts by weight of said halogenated epoxy resin flame retardant, not more than 10 parts by weight of a auxiliary flame retardant, and not more than 150 parts by weight of an inorganic filler.

The halogen-containing flame retardants of this invention are explained below. The halogenated epoxy resin flame retardants used in this invention are compounds having a structure in which part of the epoxy groups of the halogenated bisphenol epoxy resin are blocked by a $C_{1-8}$ alcohol. That is, this is a halogenated epoxy resin flame retardant shown by General Formula 1 in which the epoxy equivalent therein is in the range of 750–4000 g/eq, preferably 800–3500 g/eq, more preferably in the range of 1000–3000 g/eq. An epoxy equivalent of 750 g/eq or less means a high epoxy group concentration, thus a low molecular weight, so that it offers little heat resistance and tends to gel when blended with a thermoplastic resin. Its low molecular weight is disadvantageous in that it has low softening point and is difficult to handle. An epoxy equivalent exceeding 4000 g/eq means a low epoxy content so that it is not expected to give much effect of inhibiting the hydrolysis of a thermoplastic resin containing carbonyl linkages in the main chain.

The degree of polymerization, n, in Formula 1 should be in the range of 0–10, preferably 0.5–9, most preferably 1–8. A degree of polymerization exceeding 10 means a low epoxy concentration and cannot be expected to provide an effect of inhibiting hydrolysis. It will also have a high melt viscosity, making it difficult to achieve a high flow rate.

The ratio of (Formula I)/(Formula II) in the general formula 1 is 2/1–1/2, preferably in the range of 1.8/1–1/1.8 and 1.5/1–1/1.5. A ratio exceeding 2/1 means a higher epoxy group concentration so that its heat resistance will fall when it is blended with a thermoplastic resin, tending to cause gellation. A ratio less than 1/2 means a low epoxy group content, which cannot be expected to enhance resistance to hydrolysis effectively.

The alcohol used for blocking the epoxy groups of the halogenated epoxy resin should preferably have not more than 8 carbon atoms, more preferably not more than 6. The use of a compound having 10 or more carbon atoms would mean a considerable reduction in the halogen content in the flame retardant, giving a low flame retardation effect, thereby reducing the heat resistance, heat distortion temperature, and mechanical properties of the resulting flame resistant resin composition. In order to improve flame retardation effect, one may make a combined use of a short chain alcohol and a halogenated phenol.

The halogenated epoxy resin flame retardant as shown by General Chemical Formula 1 used in this invention can be obtained by treating, for example, a halogenated diepoxy compound, resulting from the reaction of a halogenated bisphenol such as tetrabromobisphenol A or the like with an epihalohydrin, with an alcohol in an amount of 0.3–0.7 equivalents of alcohol per equivalent of the epoxy group in the presence of a base catalyst, stannic tetrachloride, boron trifluoride ether complex or the like at temperatures in the range of 50–120° C.

In addition, a diglycidyl ether of a halogenated bisphenol, along with a halogenated bisphenol may be reacted in the presence of an alkali metal, phosphine, phosphonium salt, tertiary amine or like base catalyst at 100–250° C. to give a diepoxy compound which may be used as a starting material to be treated with the alcohol. An addition reaction product of a halogenated bisphenol with a monoglycidyl ether of an alcohol may be further reacted with a diglycidyl ether of a halogenated bisphenol. Furthermore, an epihalohydrin may be reacted with an alcohol in the presence of a boron trifluoride ether complex or the like, followed by adding a halogenated bisphenol and an epihalohydrin to be reacted in the presence of an alkali hydroxide to give these compounds.

The degree of polymerization of the halogenated epoxy resin flame retardant of this invention is preferably about 0–10, without being limited to this range. The degree of polymerization of the flame retardant should suitably be selected, depending on the required functionality of a composition of a carbonyl-containing thermoplastic resin and the flame retardant. The degree of polymerization and epoxy equivalent can be readily controlled by controlling the molar ratio of each starting material.

The starting materials for the halogenated epoxy resins are specifically, for example, tetrachlorobisphenol A diglycidyl ether; tetrabromobisphenol A diglycidyl ether, tetrabromobisphencl F diglycidyl ether, tetrabromobisphenol S diglycidyl ether, tetrabromohydroxy quinone diglycidyl ether, bromophenol novolak glycidyl ether, and the like.

$C_{1-8}$ alcohols that are used to block the epoxy groups of the halogenated epoxy resins are specifically, for example, methanol, ethanol, propanol, butanol, amyl alcohol, hexanol, heptanol, benzyl alcohol, and isomers thereof.

An explanation is given below for the flame resistant thermoplastic resin compositions having carbonyl linkages in their main chains. The thermoplastic resins having carbonyl linkages in the main chain that can be used in this invention include phthalate polyester resins such as PET, PBT, polyamide resins, polycarbonate resins, and polymer alloys of any desired combinations of one component from the above thermoplastic resins containing carbonyl linkages in the main chain with other thermoplastic resins such as polyolefins, PE, PP, and the like, polystyrenes such as ABS, and the like, polyethers such as polyphenylene ether, and the like.

It is suitable to use a PBT or PET having an inherent viscosity of 0.4 dl/g or higher (PBT: measured at 25° C. in a mixture of phenol/trichloromethane: 6/4; PET: measured at 30° C. in phenol/trichloroethan=1/1).

When the flame retardant of this invention is used for blending it with a thermoplastic resin, the flame retardant is preferably used in an amount of 1–40 parts by weight, particularly 2–30 parts by weight per 100 parts by weight of the thermoplastic resin. It may be permissible to use other flame retardants in addition to the flame retardant of this invention unless the effect of the instant application is adversely affected in particular. The auxiliary flame retardants include a combined use of not more than 10 parts by weight, preferably not more than 8 parts by weight of antimony trioxide, antimony pentoxide, sodium antimonate, antimony phosphate, and molybdenum oxide, thereby further enhancing the flame retardation effect. A combined use of not more than 150 parts by weight, preferably not more than 120 parts by weight of a reinforcing filler such as glass fibers, carbon fibers, potassium titanate fibers, calcium carbonate, barium sulfate, and the like, can further reinforce the mechanical properties of the molded articles. It is also permissible to make a combined use of a lubricant, UV absorber, antioxident, coloring pigment, dye, mold release, filler, and other additive.

EXAMPLES

The effect of this invention is further specifically explained below using examples of this invention and comparative examples, but the invention is not necessarily limited to these examples. In the examples, parts and percentages shown are all based on weight. The present invention used the following test procedures:

(1) Epoxy equivalent: JIS K-7234
(2) Softening point: JIS K-7236
(3) Bromine content: The sample was fused and digested at 400° C. using extra pure grade potassium hydroxide and ethanol, dissolved in deionized water, neutralized with nitric acid, then assayed for the potassium bromide generated therein by potentiometric titration with aqueous silver nitrate.
(4) FTIR: This was measured using a 0.2 mm thick KBr plate liquid cell with the sample in a dichloromethane solution. The structure was confirmed by absorption bands for methylene near 2960 cm$^{-1}$ an epoxy ring near 915 cm$^{-1}$ and so on.
(5) High performance liquid chromatography (HPLC): A liquid chromatograph (LC) was used along with tetrahydrofuran (THF)/water/acetonitrile (ACN) as the mobile phase; the column was a TSKgel ODS-120T, manufactured by Tosoh Company, with the determination made at 280 nm using a UV detector to confirm that the main peak area ratio was at least 40%.
(6) Flammability test: A 1/32" test slab was examined according to the UL-94 test procedure.
(7) Hydrolysis resistance: An ASTM #1 dumbbell was aged 200 hours under conditions of 121° C., 2 atmospheric pressures, and humidity 100%, and hydrolysis resistance was measured in terms of the percent hydrolysis resistance=(tensile strength of test piece after aging/tensile strength of test piece before aging)× 100%.
(8) Presence of gels: A compounded composition of PBT/flame retardant/$Sb_2O_3$:80/50/5 was milled using a 2 screw-"plastomill", manufactured by Haake Buchler Company HBI System 90, under conditions of 260° C. and 150 rpm for 1 hour to see any formation of gels.

[Examples]

[Preparation Example 1 for Halogenated Epoxy Resin]

81.5 g of methanol was placed in a 10 l separable-flask equipped with a thermometer, stirrer, a dropping device, and a condenser and heated with stirring and with nitrogen purging, followed by adding 3.8 g of 47% boron trifluoride ether complex, and then 235.6 g of epichlorohydrin (abbreviated as ECH) over a period of 2 hours, further allowing reaction to take place for 4 hours; and 2443 g of tetrabromobisphenol A (abbreviated as TBA) and 890 g of methylisobutyl ketone (abbreviated as MIBK) were added and then 365 g of 49% aqueous NaOH added for reaction to take place for 1 hour at 90° C.; this was then followed by further adding 550 g of ECH to react for 3 hours. Then 10 g of 49% aqueous sodium hydroxide and 1100 g of MIBK were added, and the mixture was allowed to react for 4 hours at 90° C., diluted with MIBK, treated with deionized water to be freed of any sodium chloride from the system, neutralized with phosphoric acid, washed with water; the resin solution was filtered, and the solvent removed at reduced pressure. This gave a halogenated epoxy resin (abbreviated as K) with part of the terminal epoxy group blocked with methanol and having an epoxy equivalent of 617 g/eq, a bromine content of 48.3%, a softening temperature of 61° C.

[Example 1]

864 g of the brominated epoxy resin (K) with part of the terminal epoxy groups blocked with methanol, as obtained in the above halogenated epoxy resin preparation example and 76.2 g of TBA were placed in a 2 l separable-flask provided with a thermometer, stirrer, dropping device, and condenser, and heated with nitrogen purging to dissolve the contents, and reacted in the presence of 0.1 g of triphenyl phosphine added as a catalyst for 8 hours at 170° C. The product had an epoxy equivalent of 845/eq with a softening temperature of 83° C.; it was confirmed that the main product had the structure of Chemical Formula 2 according to FTIR spectroscopy and high performance liquid chromatography (HPLC).

Formula 2:

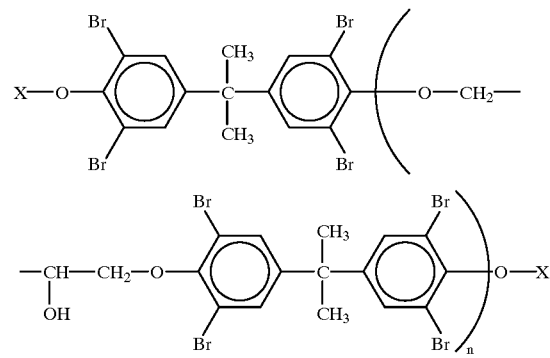

where X is Formula III:

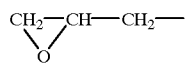

or Formula IV:

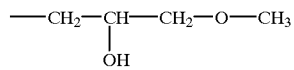

The (Formula III)/(Formula IV) ratio was 1.7/1.0. The product is designated flame retardant A. The degree of polymerization n was 0.6, as shown in Table 1.

[Example 2]

926 g of the brominated epoxy resin (K) obtained in preparation example 1 and 216 g of TBA were charged and reacted in a manner similar to that of Example 1 except for replacing the catalyst with phosphonium bromide. The product had a softening temperature of 110° C. and an epoxy equivalent of 1620 g/eq and it was confirmed that the main product has the structure of Chemical Formula 2 according to FTIR spectroscopy and high performance liquid chromatography (HPLC), where the (Formula III)/(Formula IV) ratio was 1.9/2.0. The product is designated flame retardant B.

[Example 3]

926 g of the brominated epoxy resin (K) obtained in preparation example 1 and 298 g of TBA were charged and reacted in a manner similar to that of Example 1 except for replacing the catalyst with phosphonium bromide. The product had a softening temperature of 128° C. and an epoxy equivalent of 3120 g/eq and it was confirmed that the main product had the structure of Chemical Formula 2 according to FTIR spectroscopy and high performance liquid chromatography (HPLC), where the (Formula III)/(Formula IV) ratio was 1.1/2.0. The product is designated flame retardant C.

[Example 4]

289 g of the brominated epoxy resin (K) obtained in preparation example 1, 1024 g of YDB-400 (manufactured by Toto Kasei KK), a brominated epoxy resin having an epoxy equivalent 398 g/eq and a bromine content 48%, softening temperature 67° C., which had been manufactured from TBA and ECH, and 687 g of TBA were charged and reacted in a manner similar to that of Example 1. It was confirmed that the main product had the structure of Chemical. Formula 2 according to FTIR spectroscopy and high performance liquid chromatography (HPLC), where the (Formula III)/(Formula IV) ratio was 2.0/1.0. The product is designated flame retardant D.

[Example 5]

608 g of TBA, 63 g of butylglycidyl ether with an epoxy equivalent of 135 g/eq, and 220 g of MIBK were placed in a 3 l separable-flask equipped with a thermometer, stirrer, dropwise addition device, and a condenser, followed by heating with nitrogen purging, dissolving the contents, adding 20 g of 48% aqueous NaOH solution, and reacting 2 hours at 85–90° C.; then 104 g of ECH was added and the reaction was allowed to take place for 3 hours, followed by adding 100 g of aqueous NaOH solution and reacting 4 hours at 85–90° C. After the reaction was over, the resin solution was diluted with MIBK and washed with deionized water to remove the sodium chloride from the system, neutralized with phosphoric acid, washed, and freed of MIBK by vaporizing it off to give a cream yellow flame retardant E. It had a softening temperature of 102° C. and an epoxy equivalent of 1910 g/eq; and it was confirmed that the main product had the structure of Chemical Formula 3 according to FTIR spectroscopy and high performance liquid chromatography (HPLC).

Formula 3:

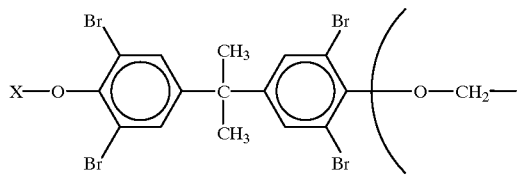

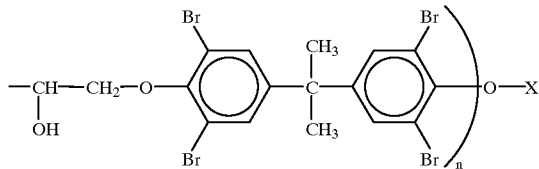

where X is Formula V:

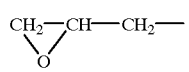

or Formula VI:

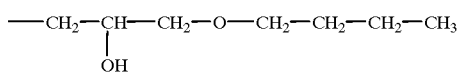

The (Formula V/(Formula VI) ratio was 1.1/1.0. The product is designated flame retardant E. The degree of polymerization n was 2.0, as shown in Table 1.

[Comparative Example 1]

769 g of YDB-400 (manufactured by Toto Kasei KK), a brominated epoxy resin, having an epoxy equivalent of 398 g/eq and a bromine content 48% and a softening point 67° C., which had been manufactured from TBA and ECH, and 299 g of TBA were charged and reacted in the presence of 0.25 g of triphenyphosphine added as a catalyst for 8 hours at 190° C. to give a brominated epoxy resin having 2 epoxy end groups, an epoxy equivalent of 1245 g/eq, and softening point of 130° C.

[Comparative Example 2]

864 g of the brominated epoxy resin with part of the terminal epoxy group blocked with methanol that had been obtained in preparation example 1 and 320 g of TBA were charged and reacted in a manner similar to that of Example 1. This gave a flame retardant G having an epoxy equivalent of 5320 g/eq and a softening point of 142° C. It was confirmed that the main product had chemical structure 2 according to FTIR spectroscopy and high performance liquid chromatography (HPLC), where the (Formula III)/(Formula IV) ratio was 1.1/3.1.

[Comparative Example 3]

500 g of YDB-400 (a brominated epoxy resin, manufacture by Toto Kasei KK from TBA and ECH: epoxy equivalent 705 g/eq, softening point 104° C., bromine content 51%) and 2.5l of methanol were charged and reacted in the presence of 50 ml of 25% sodium methoxide methanolic solution added as a catalyst for 24 hours at: the reflux temperature of about 65° C. The product is designated flame retardant H. It was confirmed that the main product had the structure of Chemical Formula 4 according to FTIR spectroscopy and high performance liquid chromatography (HPLC).

Formula 4:

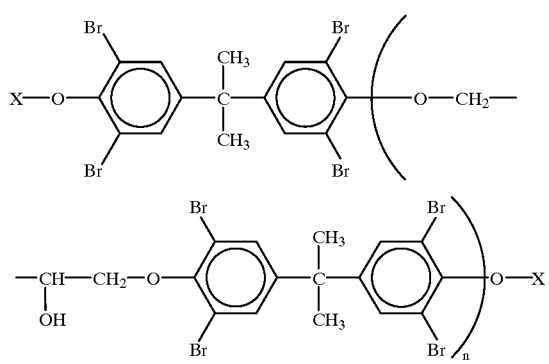

where X is Formula VII:

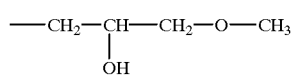

In order to test the effectiveness of these flame retardants prepared herein, the physical properties of compositions obtained by blending them with thermoplastic resins were studied.

[Examples 5–8 and Comparative Examples 4–6]

Flame retardants A–E obtained in Examples 1–5 and flame retardants F–G obtained in Comparative Examples 1–3 are shown in Table 1 for their general properties. Thermoplastic resin compositions were compounded according to the compositions given in Table 2, mixed in a Henschel mixer and, melt- milled through a twin screw extruder (PCM-30 Model, manufactured by Ikegami Tekko KK) to give the compounds. The compounds were further injection molded to give test pieces. These test pieces were used to measure flammability, the presence of gels, resistance to hydrolysis. The results are given in Table 2.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Flame retardants | A | B | C | D | E | F | G | H |
| Main product | Chemical Formula 2 | Chemical Formula 2 | Chemical Formula 2 | Chemical Formula 2 | Chemical Formula 3 | Diepoxide | Chemical Formula 2 | Chemical Formula 4 |
| Epoxy equivalent (g/eq.) | 845 | 1620 | 3120 | 3952 | 1910 | 1245 | 5230 | TRACE |
| Degree of polymerization (n) | 0.6 | 1.6 | 4.1 | 8.1 | 2.0 | 3.0 | 7.8 | 1.3 |
| Softening point (° C.) | 83 | 110 | 128 | 174 | 102 | 130 | 142 | 105 |
| Bromine content (%) | 49.2 | 50.3 | 50.8 | 51.8 | 48.7 | 51.0 | 51.1 | 48.7 |

TABLE 2

|  | Example 6 | Example 7 | Example 8 | Example 9 | Example 10 | Comparative Example 4 | Comparative Example 5 | Comparative Example 6 |
|---|---|---|---|---|---|---|---|---|
| Blend ratio Parts by weight |  |  |  |  |  |  |  |  |
| PBT resin | 50 | 50 | 50 | 50 | 50 | 50 | 50 | 50 |
| Flame retardant | A | B | C | D | E | F | G | H |
|  | 15 | 15 | 15 | 15 | 15 | 15 | 15 | 15 |
| $Sb_2O_3$ | 5 | 5 | 5 | 5 | 5 | 5 | 5 | 5 |
| Glass fibers | 30 | 30 | 30 | 30 | 30 | 30 | 30 | 30 |
| Flammability (UL-94) | V-0 | V-0 | V-0 | V-0 | V-0 | V-0 | V-0 | V-0 |
| Resistance to hydrolysis (%) | 70 | 67 | 62 | 63 | 65 | 68 | 48 | 34 |
| Presence of gels | None | None | None | None | None | Yes | None | None |

The flame retardants A–E used in Example 6–10 had epoxy equivalents in the range of 750–4000 g/eq and degrees of polymerization in the range of 0–10, and did not cause any gellation in molding resin compositions; and molded articles from such resin compositions gave excellent resistance to hydrolysis. The flame retardants used in Comparative Examples 4–6 did gave the following results: Flame retardant F, having the degree of polymerization and epoxy equivalent within the designated ranges, had both terminals being epoxy groups without having them blocked by alkyl groups, so that they gave molded articles with good resistance to hydrolysis, but they caused gellation during the molding of the resin compositions. In Comparative Example 5, the flame retardant G having a high epoxy equivalent, gave a molded article with poor resistance to hydrolysis. In Comparative Example 6, the flame retardant H, essentially lacking epoxy groups gave a molded article with poor resistance to hydrolysis.

ADVANTAGES OF THE INVENTION

The flame retardants of this invention mainly comprise halogenated epoxy resin flame retardants having the structure of Chemical Formula 1 in which part of the epoxy groups of a halogenated epoxy resin is blocked with a $C_{1-8}$ alcohol. A combined use of said flame retardant with an auxiliary flame retardant such as antimony trioxide, a fiber reinforcing agent, an inorganic filler, or the like, can impart flame resistance to the thermoplastic resins. Flame resistant compositions obtained by using the flame retardants of this invention in thermoplastic resins having carbonyl linkages in the main chain exhibit excellent resistance to hydrolysis and can resist any gellation in an extruder or injection molder. Flame resistant compositions of polyesters such as PET and PBT, polycarbonate, polyamide, and of polymer alloys containing such polymers as a component can offer not only excellent resistance to hydrolysis, gel prevention, and high flow, but also improved productivity in molding.

We claim:

1. A halogenated epoxy resin flame retardant for a thermoplastic resin having carbonyl linkages in the main chain, comprising a halogenated epoxy resin flame retardant represented by Chemical Formula 1 and having an epoxy equivalent in the range of 750–4000 g/eq:

wherein Chemical Formula 1 is:

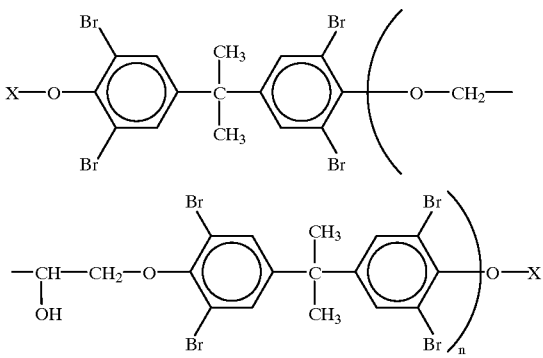

where n in the range of 0–10, and X is Formula I:

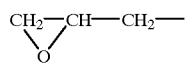

or Formula II:

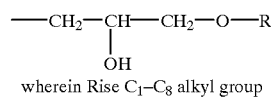

wherein R is a $C_1$–$C_8$ alkyl group and the ratio of (Formula I)/Formula II) is from 2/1–1/2.

2. A halogenated epoxy resin flame retardant according to claim 1, wherein the ratio of (Formula I)/(Formula II) is in the range of from 1.8/1–1/1.8.

3. A halogenated epoxy resin flame retardant according to claim 1, wherein the ratio of (Formula I)/(Formula II) is in the range of from 1.5/1–1/1.5.

4. A halogenated epoxy resin flame retardant according to claim 1, represented by the chemical formula:

Chemical Formula 2:

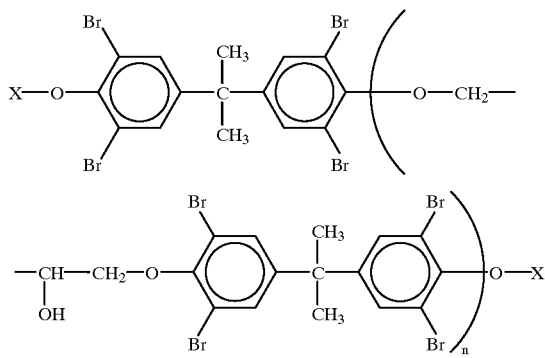

where X is Formula III:

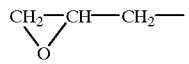

or Formula IV:

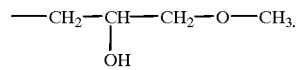

wherein the degree of polymerization n is in the range of 0–10.

5. A halogenated epoxy resin flame retardant according to claim 1, represented by the chemical formula:

Chemical Formula 3:
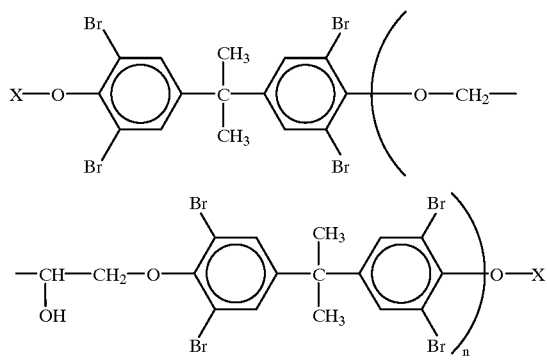
where X is Formula V:
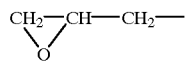
or Formula VI:
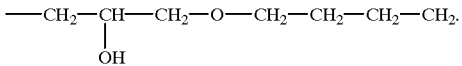
wherein the degree of polymerization n is in the range of 0–10.
* * * * *